(No Model.) 5 Sheets—Sheet 5.

C. PIEPER.
MACHINE FOR MANUFACTURING JOINTS OF UMBRELLA RIBS.

No. 392,879. Patented Nov. 13, 1888.

Witnesses:
E. R. Brown.
E. L. Richards.

Inventor.
Carl Pieper,
By Richards
Attorneys.

UNITED STATES PATENT OFFICE.

CARL PIEPER, OF WEYER, GERMANY, ASSIGNOR TO KORTENBACH & RANK, OF SAME PLACE.

MACHINE FOR MANUFACTURING JOINTS OF UMBRELLA-RIBS.

SPECIFICATION forming part of Letters Patent No. 392,879, dated November 13, 1888.

Application filed July 5, 1888. Serial No. 279,005. (No model.)

*To all whom it may concern:*

Be it known that I, CARL PIEPER, a subject of the King of Prussia and Emperor of Germany, and a resident of the city of Weyer, in the Kingdom of Prussia, German Empire, have invented certain new and useful Improvements in Machines for Manufacturing Joints of Umbrella-Ribs; and I do hereby declare that the following is a full, clear, and exact description of the same.

My invention relates to an apparatus for making the joint which connects the stretcher to the umbrella-rib and for securing said joint to the rib; and the invention consists in certain novel details of construction, combination, and operation of the various parts of the machine, whereby the entire work is performed automatically, as hereinafter more particularly described.

The invention will be understood on reference to the accompanying drawings, in which—

Figure 1:
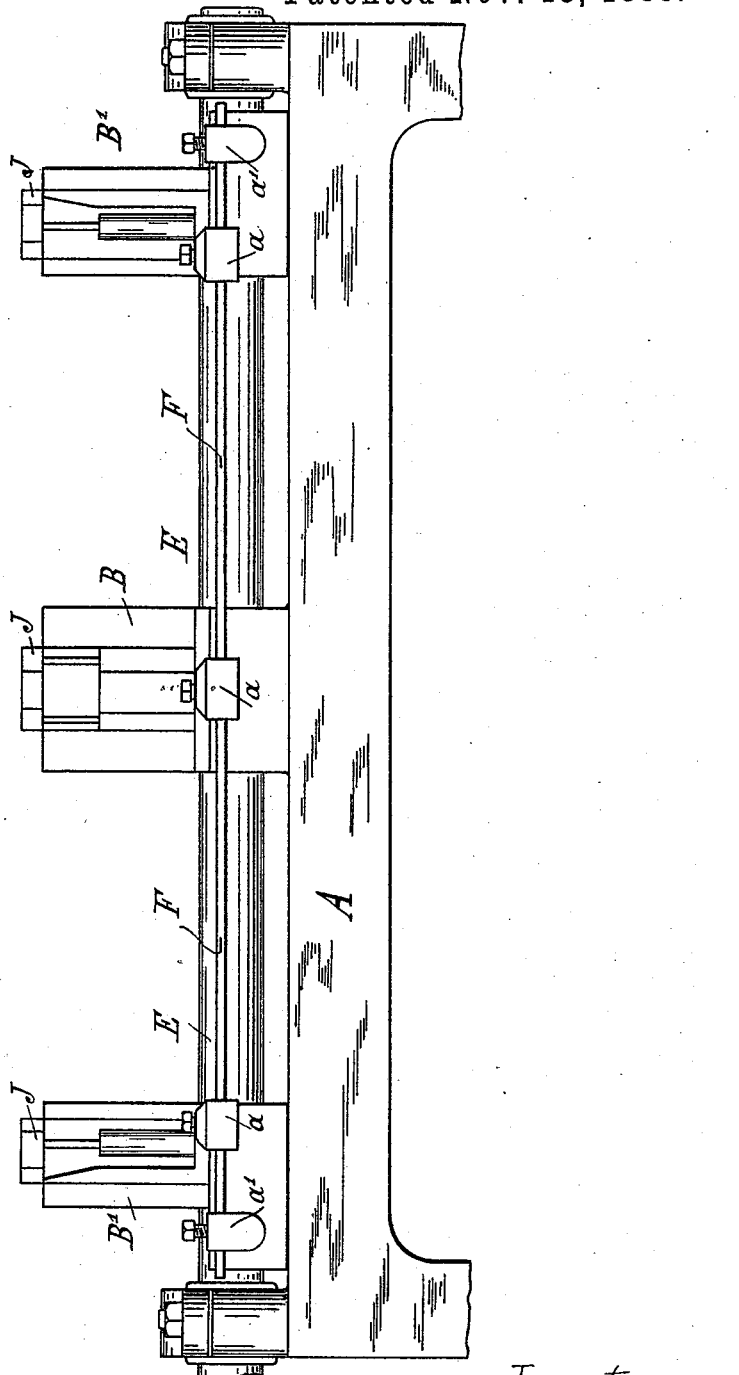
Figure 2:
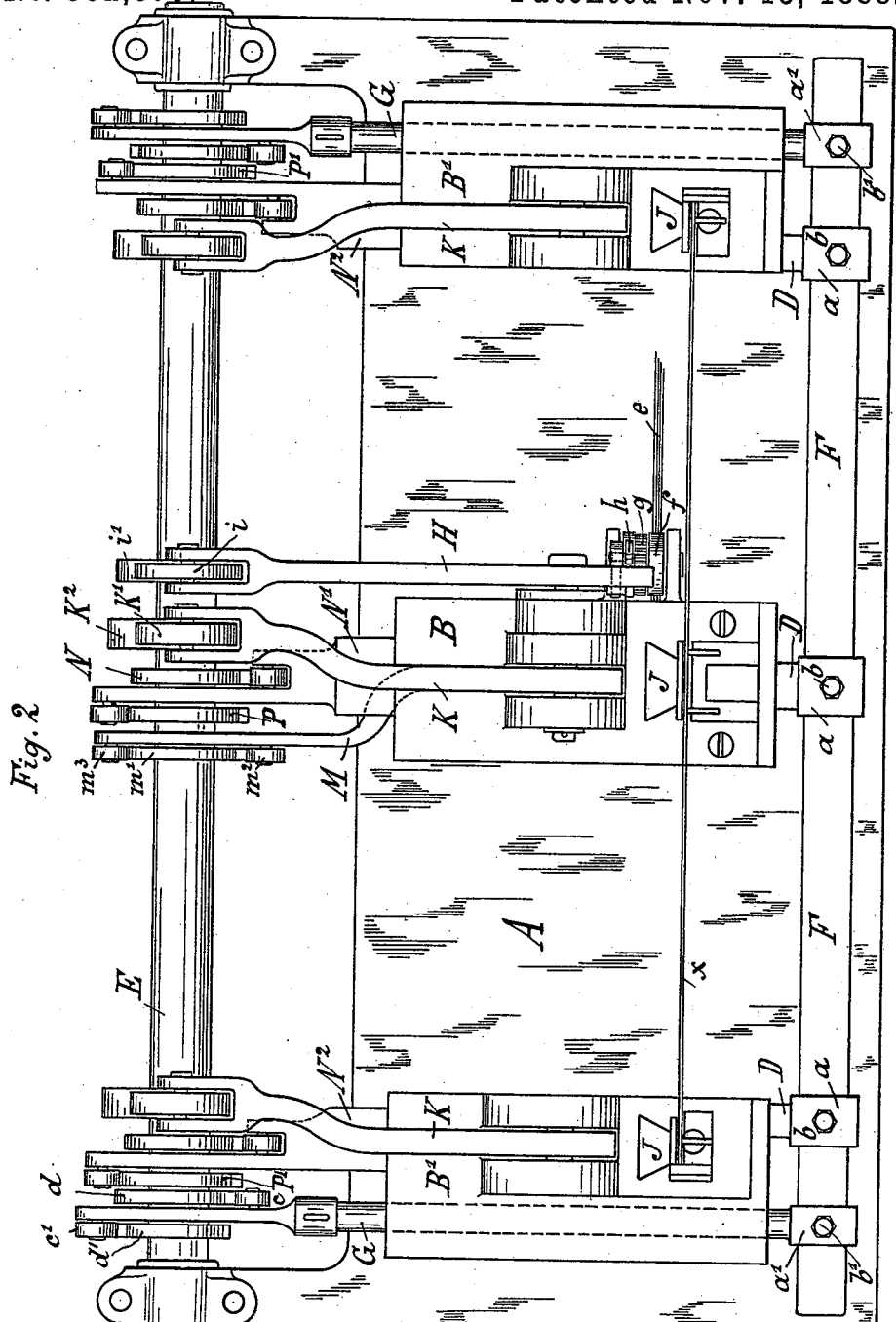
Figure 3:
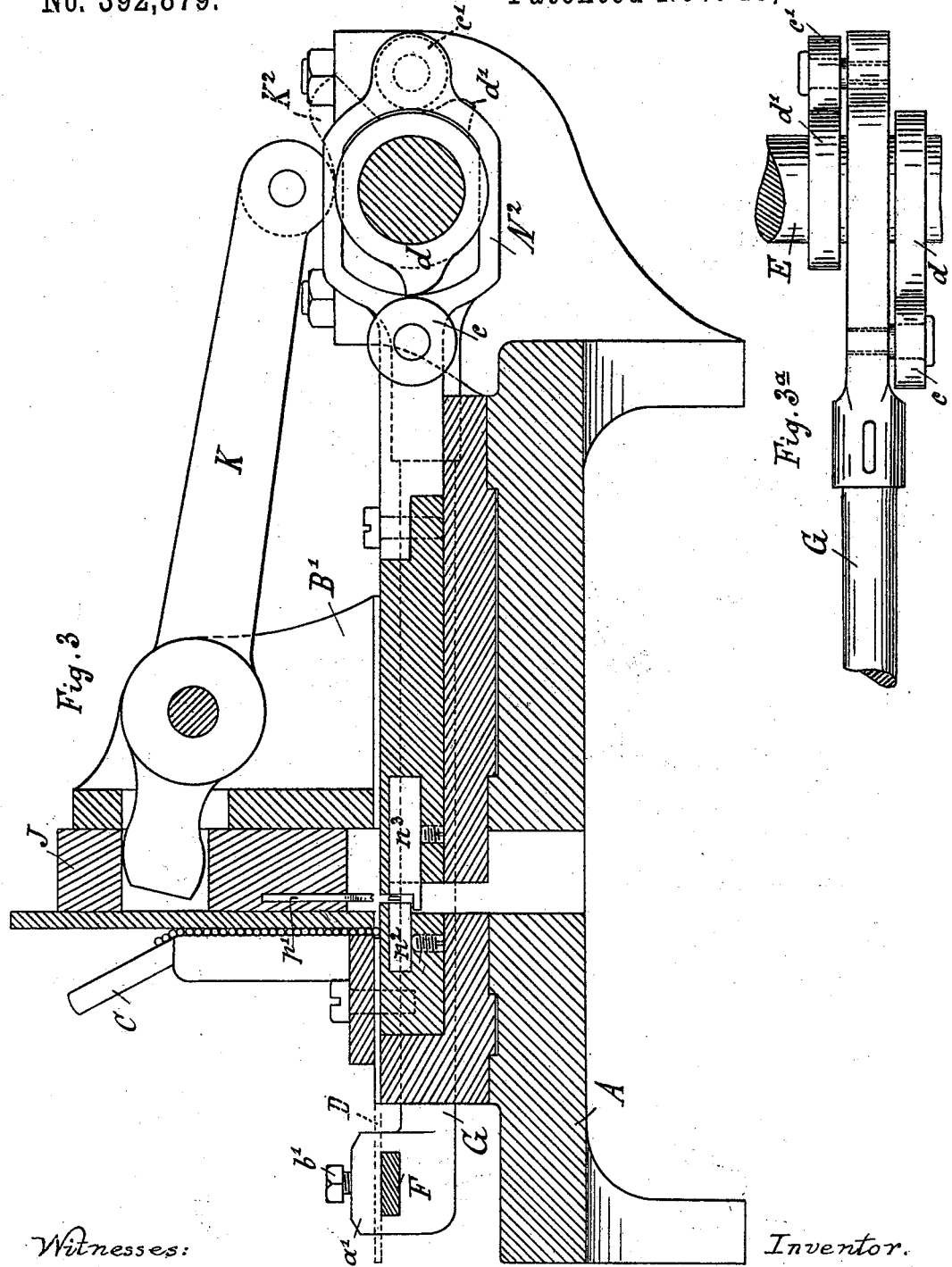
Figure 4:
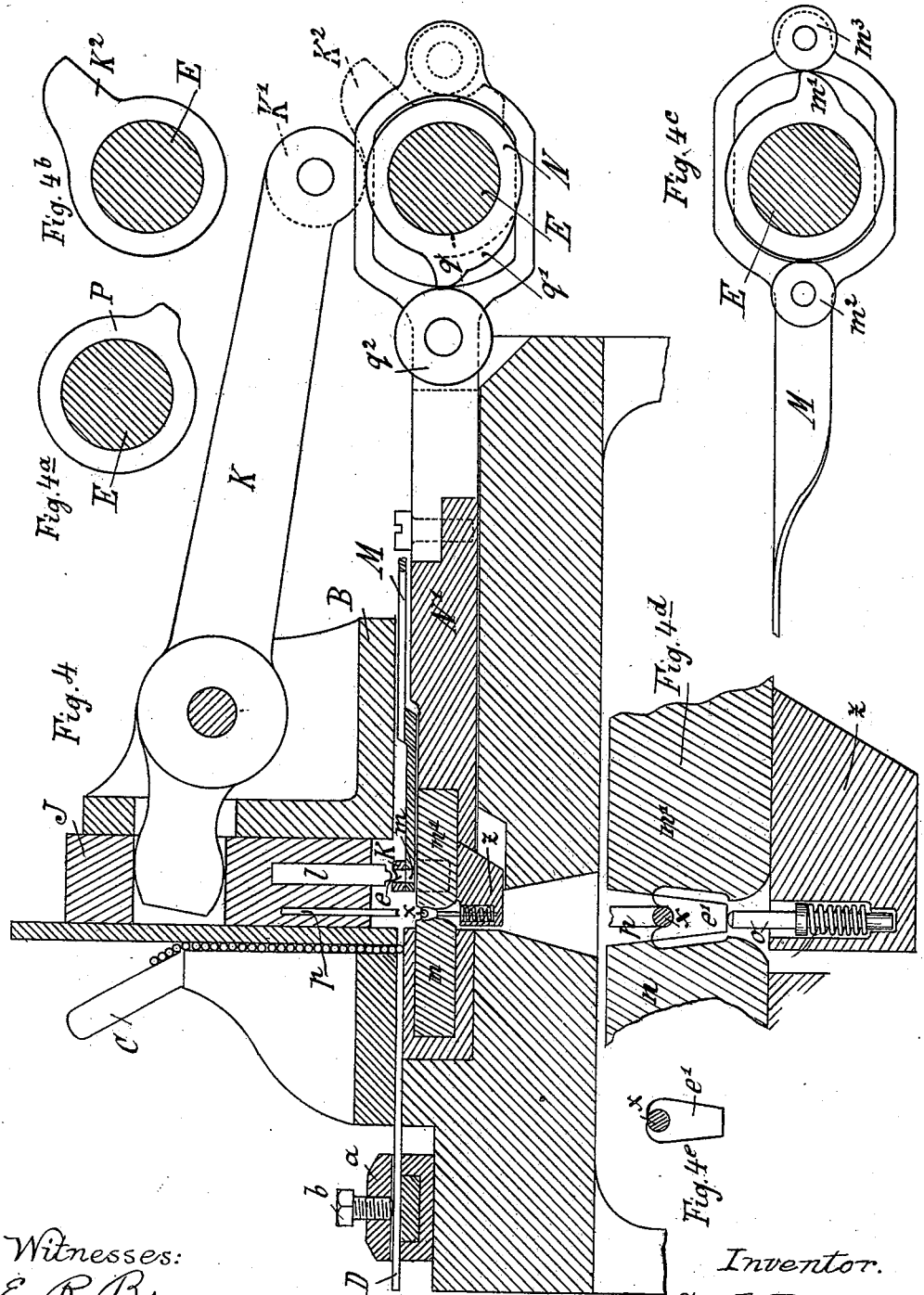
Figure 5:
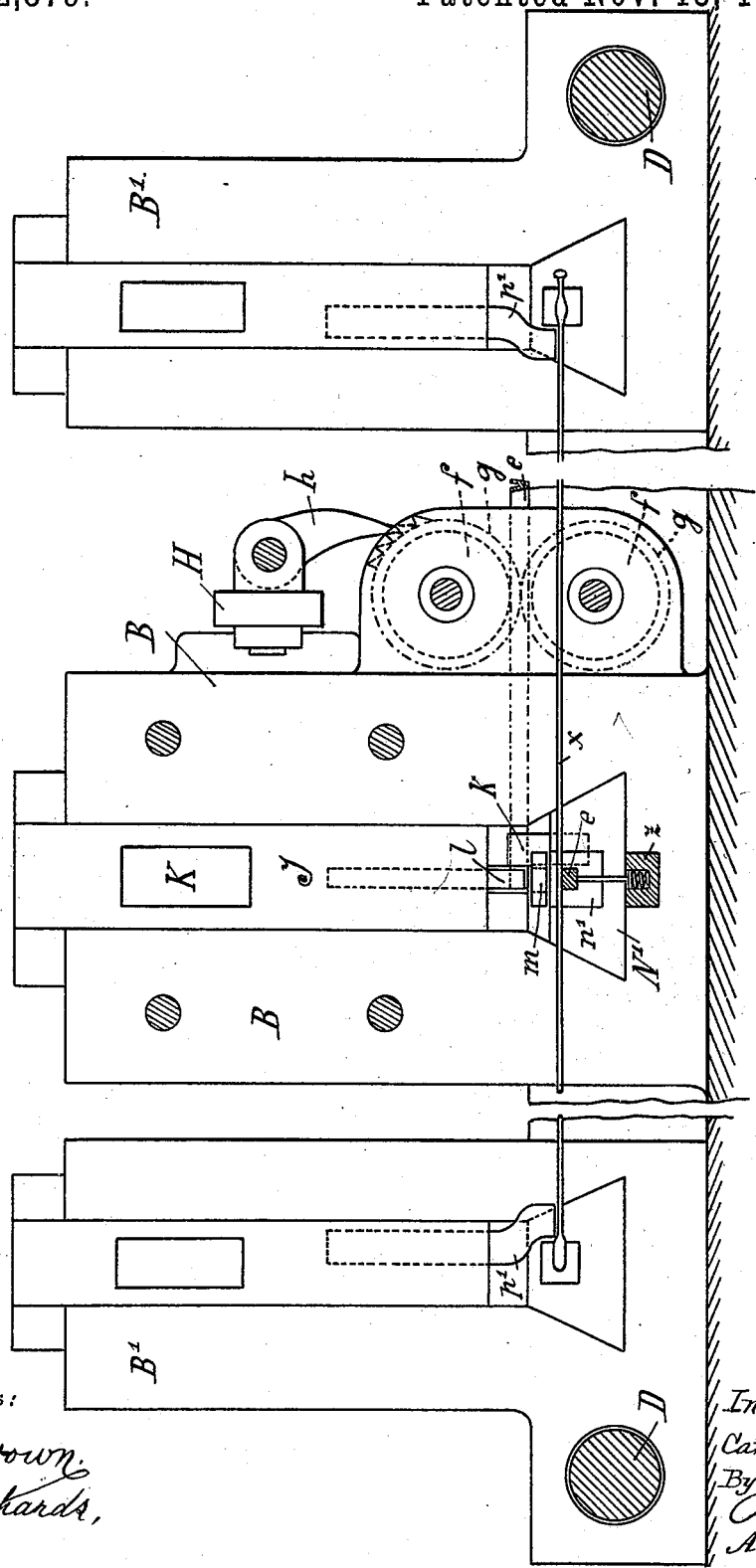

Figure 1 is a front view of a machine constructed according to my invention. Fig. 2 is a top view of the same. Figs. 3, 4, and 5 are vertical sectional views of the holding and pressing mechanisms. Figs. 3ª, 4ª, 4ᵇ, 4ᶜ, 4ᵈ, and 4ᵉ are detail views.

From the base or bed plate A extend upward three standards, B B' B'. The central standard, B, is permanently fixed, and the other two standards, B' B', are adjustable nearer to or farther from the central one to accommodate ribs of different lengths. The central standard, B, carries the pressing and cutting mechanism, and the other two carry the mechanism for holding the rib while it is being operated upon. In front of each standard is a hopper, C, (see Figs. 3 and 4,) the bottom of which terminates in a narrow channel, through which the ribs are guided and drop in correct position into the track of the forwarding-slide D, from whence they are carried singly by the forwarding-slide to a point where they drop into a groove in the bed on the joint-eye, which has been previously cut by the machine.

The operation of the forwarding-slide is effected by the cam-disks $d$ $d'$, (see Fig. 3,) which are carried by the main shaft E, journaled in the frame of the machine, from which shaft motion is also imparted to the other working parts. The rib drops through the hoppers into the track of the slide in such a position with relation to the standards B B' B' (see Figs. 3 and 4) that it is caught by the three slides D at both ends and in the middle and pushed forward. The three slides are connected to each other, so as to move simultaneously, by means of a bar, F, secured in clamps $a$ $a'$ by set-screws $b$ $b'$, said clamps $a'$ being connected by set-screws $b'$ to sliding rods G. (See Figs. 1, 3, and 3ª.)

The sliding connecting-rods G move rectilinearly in ways above the bed-plate of the machine. Their rear ends are formed with links which surround the main shaft E between the cam-disks $d$ and $d'$, carried thereby. Each of these links is provided with two rollers, $c$ and $c'$, (see Figs. 2, 3, and 3ª,) the roller $c$ for engagement with the disk $d$ and the roller $c'$ for engagement with the disk $d'$. The forwarding-slides D are moved forward and backward alternately as the cams of the disks $d$ and $d'$ engage with the rollers $c$ and $c'$ at every revolution of the shaft E.

The joint-eye is made from a wire, $e$, the upper edge of which is grooved, as shown on an enlarged scale in Fig. 4ᵉ. This wire is in a coil and is automatically unrolled and fed as required. For this purpose it is passed between two guiding-rollers, $f$, (see Fig. 5,) provided with toothed wheels $g$, (indicated diagrammatically in the drawings by dotted lines,) which are engaged by a pawl, $h$, so as to receive an intermittent rotary motion in order to feed them to the proper point. The pawl $h$ is carried by the short arm of a lever, H, having its fulcrum on the side of the standard B and its long arm formed into a link provided with a roller, $i$, and surrounding a cam-disk, $i'$, carried by the main shaft E. (See Figs. 2 and 5.) The wire $e$ is moved forward the required length by the rollers $f$ into a groove in the lower cutter, $k$.

When the wire is pushed forward by the rotation of the rollers $f$, the required length projects from said groove and is cut by the upper cutter, $l$. This upper cutter, $l$, is held in the sledge J, which slides vertically in the central standard, B, and receives its motion from the lever K. This lever has its fulcrum on the standard B, Fig. 4, with its short arm engaging with a recess in the sledge J, and its long arm provided with a roller, K', which bears on the face of a cam-disk, K², carried by the main driving-shaft E. As the shaft E revolves, the long arm of the lever K is raised and its short arm depressed, so as to force down the sledge J and the upper cutter, $l$, and cut off the end of the wire $e$. The cut-off end of the wire $e$ is pressed in a cutting of the feeder M, which is pushed forward by the cam-disk $m'$, connected to the shaft E by means of the link M'. This link surrounds the shaft E between two cam-disks, $m'$, Fig. 2, and carries two rollers, $m^2 m^3$, Fig. 4ᵉ, engaging with the cam-disk $m'$. At the forward motion of the cut-off wire end it passes over a funnel-shaped opening between the holding-cheeks $n$ $n'$, Figs. 4, 4ᵈ, and drops into the opening, where it is caught by a tongue, $o$, below the holding-cheek $n'$, Fig. 4ᵈ, so that it stands vertically between these holding-cheeks, after which the feeder M recedes. After this operation follows the motion of the forwarding devices for the umbrella-ribs, heretofore described. The rib lying in the track of the forwarding-slide D is pushed forward and drops into the slit between the holding-cheeks $n$ $n'$, Fig. 4, on the cut-off wire end $e'$, and a stamper, $p$, presses the rib into the groove of the wire piece $e'$, and both parts are pressed downward until the elastic tongue $o$ engages with them. (See Fig. 4ᵈ.) The pressing of the rib into the groove of the cut-off wire end is done simultaneously with the cutting off of a new wire end. After the umbrella-rib $x$ is pressed into the groove of the wire piece $e'$ the holding-cheeks $n^2$ $n^3$ of the side standards come into operation and hold the umbrella-rib $x$ in the position shown in Fig. 5. After the stamper $p$ has receded the movable holding-cheek $n'$ is pushed forward by the cam-disk N against the stationary cheek $n$, by which means the edges of the groove in the piece $e'$ are turned in and pressed around the rib, forming a solid connection therewith, as shown in Fig. 4ᵉ. At the same time the lower edges of the wire piece are rounded by the pressure of the holding-cheeks, and the joint-eye is completed.

In order to prevent the turning of the rib, and thereby avoid a crooked connection of the joint eye, a holding mechanism is provided, consisting of the holding-cheeks $n^2$ $n^3$, Fig. 3, similar to those above described. These cheeks are operated by a pusher, N', driven by a cam, N, on the main shaft E.

When the wire $e$ is moved forward the required length into the groove in the lower cutter, $k$, the piece projecting out of the under cutter is cut off and drops into the slit of the feeder M, while a rib $x$ is simultaneously pressed into the groove of the wire piece $e'$, lying between the cheeks $n$ $n'$ and on the tongue $o$. The feeder M then moves forward and drops the wire piece $e'$ into the slit.

What I claim as new, and desire to secure by Letters Patent, is—

1. In a machine for the automatic manufacture of umbrella-rib joints and the simultaneous connecting of the same with the ribs, the combination of the three standards B B' B', the cutting apparatus $l$ K, connected with the central standard, the pressing apparatus consisting of the stamper $p$ and elastic tongue $o$, the movable holding-cheek $n'$ in the standard B, and the movable holding-cheek $n^3$ in the standards B', all arranged and operating substantially as herein described.

2. In a machine for the automatic manufacture of umbrella-rib joints and the simultaneous connecting of the same with the ribs, the combination of the elastically-arranged tongue $o$, the slide N', carrying the holding-cheek $n'$, the disk N, arranged on the shaft E, and the stamper $p$, all arranged and operating substantially as and for the purpose herein described.

In testimony whereof I have signed my name to this specification in the presence of two subscribing witnesses.

CARL PIEPER.

Witnesses:
  OTTO REIBER,
  JULIUS HINDRICHS.